United States Patent
Soriente et al.

(10) Patent No.: US 11,296,875 B2
(45) Date of Patent: Apr. 5, 2022

(54) PASSWORD-AUTHENTICATED PUBLIC KEY ESTABLISHMENT

(71) Applicants: NEC Laboratories Europe GmbH, Heidelberg (DE); IMDEA Software Institute, Madrid (ES)

(72) Inventors: Claudio Soriente, Madrid (ES); Antonio Faonio, Madrid (ES); Maria Isabel Gonzalez Vasco, Madrid (ES); Angel Perez del Pozo, Madrid (ES)

(73) Assignees: NEC LABORATORIES EUROPE GMBH, Heidelberg (DE); IMDEA SOFTWARE INSTITUTE, Madrid (ES)

( * ) Notice: Subject to any disclaimer, the term of this patent is extended or adjusted under 35 U.S.C. 154(b) by 179 days.

(21) Appl. No.: 16/831,844

(22) Filed: Mar. 27, 2020

(65) Prior Publication Data
US 2021/0167958 A1 Jun. 3, 2021

Related U.S. Application Data

(60) Provisional application No. 62/941,908, filed on Nov. 29, 2019.

(51) Int. Cl.
*H04L 9/08* (2006.01)
*H04L 29/06* (2006.01)
(Continued)

(52) U.S. Cl.
CPC .......... *H04L 9/0869* (2013.01); *H04L 9/3073* (2013.01); *H04L 9/3247* (2013.01); *H04L 63/0442* (2013.01); *H04L 63/083* (2013.01)

(58) Field of Classification Search
CPC ... H04L 9/0869; H04L 9/3073; H04L 9/3247; H04L 63/0442; H04L 63/083
See application file for complete search history.

(56) References Cited

U.S. PATENT DOCUMENTS

2017/0223008 A1* 8/2017 Camenisch ........... H04L 9/0863
2019/0319795 A1* 10/2019 Kong .................... H04L 9/0869
(Continued)

FOREIGN PATENT DOCUMENTS

WO   WO 2019/216950 A1   11/2019

OTHER PUBLICATIONS

Jarecki et. al., Highly-Efficient and Composable Password-Protected Secret Sharing (Or: How to Protect Your BitcoinWallet Online), 2016 IEEE European Symposium on Security and Privacy, 2016 (Year: 2016).*
(Continued)

*Primary Examiner* — Eleni A Shiferaw
*Assistant Examiner* — Bassam A Noaman
(74) *Attorney, Agent, or Firm* — Leydig, Voit & Mayer, Ltd.

(57) ABSTRACT

A method for cryptographic key provisioning includes, via a main authentication server (MAS), generating a first secret key and registering a client by performing a first portion of a first instance of a distributed threshold oblivious pseudo-random function. The first instance of the function results in the client obtaining a root secret key and the MAS obtaining a corresponding root public key. The method includes authenticating the client to the MAS by performing a first portion of a second instance of the distributed threshold oblivious pseudo-random function. The second instance of the function results in the client obtaining the root secret key. Information stored by the client, the first secret key, and a second secret key generated by a support authentication server are inputs to at least one of the first and second instances of the distributed threshold oblivious pseudo-random function.

15 Claims, 5 Drawing Sheets

(51) Int. Cl.
*H04L 9/32* (2006.01)
*H04L 9/30* (2006.01)

(56) References Cited

U.S. PATENT DOCUMENTS

| | | | | |
|---|---|---|---|---|
| 2020/0092094 A1* | 3/2020 | Resch | .................. | H04L 9/0822 |
| 2021/0243026 A1* | 8/2021 | Mohassel | .............. | H04L 9/3239 |
| 2021/0336792 A1* | 10/2021 | Agrawal | ................ | G06F 21/32 |

OTHER PUBLICATIONS

Viii. Devris et. al., Threshold Single Password Authentication, ESORICS 2017 International Workshops, DPM 2017 and CBT 2017, Oslo, Norway, Sep. 14-15, 2017 Proceedings (Year: 2017).*
Jarecki, Stanislaw et al. "TOPPSS: Cost-minimal Password-Protected Secret Sharing based on Threshold OPRF," ACNS'17, Jun. 2017.
Harchol, Yotam et al., "Distributed SSH Key Management with Proactive RSA Threshold Signatures," Jun. 10, 2018, Big Data Analytics in the Social and Ubiquitous Context: 5th International Workshop on Modeling Social Media, MSM 2014, 5th International Workshop on Mining Ubiquitous and Social Environments, MUSE 2014 and first International Workshop on Machine LE, XP047474853.

* cited by examiner

PASSWORD-AUTHENTICATED PUBLIC KEY ESTABLISHMENT

CROSS-REFERENCE TO RELATED APPLICATION

Priority is claimed to U.S. Provisional patent Application No. 62/941,908, filed on Nov. 29, 2019, the entire disclosure of which is hereby incorporated by reference herein.

FIELD

The present invention relates to a method and system for public key establishment, for authenticating users, and for generating user messages which cannot be repudiated.

BACKGROUND

In the context of client-server applications (e.g., online banking, internet of things ("IoT"), etc.), a client authenticates a server by means of the server's digital certificate whereas, in most of the cases, the server authenticates the client by means of a password (e.g., a password supplied by the client). In case of dispute, messages from the server, if signed with its private key, can be ascribed (e.g., attributed) without ambiguity to the author. This is not possible, however, for messages from the client.

SUMMARY

In an embodiment, the present invention provides a method for cryptographic key provisioning including, via a main authentication server (MAS), generating a first secret key and registering a client by performing a first portion of a first instance of a distributed threshold oblivious pseudo-random function. The first instance of the function results in the client obtaining a root secret key and the MAS obtaining a corresponding root public key. The method includes authenticating the client to the MAS by performing a first portion of a second instance of the distributed threshold oblivious pseudo-random function. The second instance of the function results in the client obtaining the root secret key. Information stored by the client, the first secret key, and a second secret key generated by a support authentication server are inputs to at least one of the first and second instances of the distributed threshold oblivious pseudo-random function.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
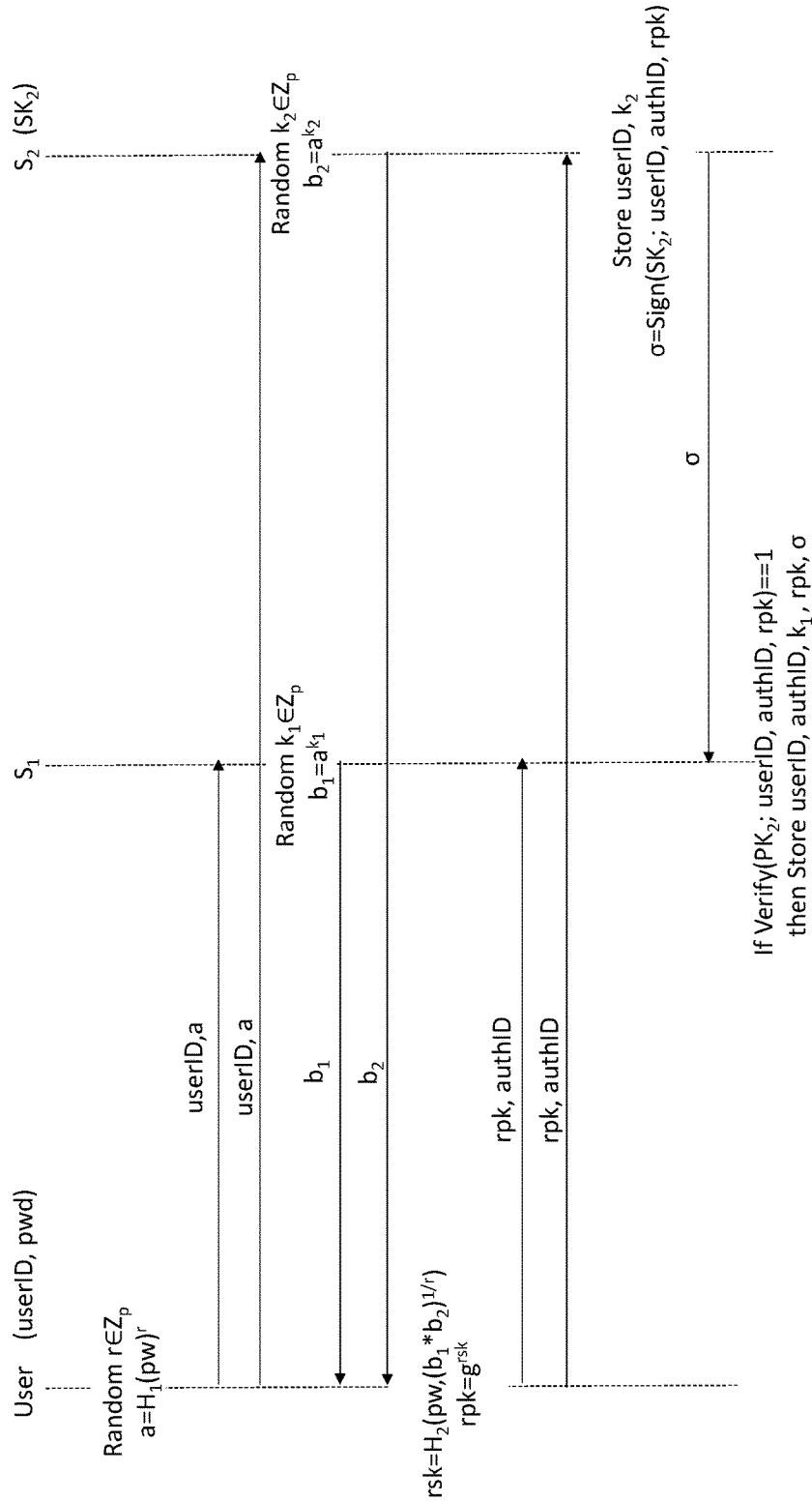
FIG. 1 illustrates a method for registration according to an embodiment of the present invention.

In an embodiment, the present invention provides a method for cryptographic key establishment. The method includes, via a main authentication server (MAS), generating a first secret key. A support authentication server (SAS) generates a second secret key. The client registers with the MAS by performing, with the MAS, a portion of a threshold oblivious pseudo-random function, and with the SAS, the remaining portion of a threshold oblivious pseudo-random function, resulting in the client obtaining a root secret key whereas MAS and SAS obtain the corresponding root public key.

According to an embodiment, the client authenticates to the MAS by performing, with the MAS, a portion of a threshold oblivious pseudo-random function, and with the SAS, the remaining portion of a threshold oblivious pseudo-random function, resulting in the client obtaining the same root secret key obtained during registration. Next, the client creates a fresh asymmetric key pair that includes randomness provided by the MAS, and signs it (e.g., the fresh public key of the asymmetric key pair) with the root secret key whereas the server verifies the signature with the corresponding root public key. A password stored on the client, the first secret key of the MAS, and the second secret key of the SAS are inputs to the distributed threshold oblivious pseudo-random function used during registration and during authentication.

In an embodiment, the present invention provides a method for cryptographic key provisioning including, via a main authentication server (MAS), generating a first secret key. A support authentication server (SAS) generates a second secret key. The method includes, with the MAS, registering a client by performing a first portion of a first instance of a distributed threshold oblivious pseudo-random function with the client. The SAS performs a second portion of the first instance of the threshold oblivious pseudo-random function with the client. As a result, the client obtains a root secret key, the MAS obtains a corresponding root public key, and the SAS obtains the corresponding root public key.

In an embodiment, the method includes, via the MAS, authenticating the client to the MAS by performing a first portion of a second instance of the distributed threshold oblivious pseudo-random function. The SAS performs a second portion of the second instance of the threshold oblivious pseudo-random function. As a result, the client obtains the root secret key.

In an embodiment, the client creates a fresh asymmetric key pair based on randomness supplied by the MAS, signs at least a portion of the fresh asymmetric key pair with the root secret key, and transmits the signed portion to the MAS. The method includes, according to an embodiment, via the MAS, verifying the signed portion with the corresponding root public key. A password stored by the client, the first secret key of the MAS, and the second secret key of the SAS are inputs to the first and second instances of the distributed threshold oblivious pseudo-random function.

Non-repudiation of user messages is a desirable property in a number of scenarios. For example, in an online banking application, the banking server may ask the user (the client) to authenticate requests to, e.g., transfer funds to other accounts. Later, in case of dispute, the server may wish to prove to a third party (e.g., a court) that the user had indeed requested the disputed operation. Similarly, in Internet-of-Things (IoT) applications, the processing server may wish to pinpoint the owner of the device that produced a specific data report.

A potential solution leverages "cloud-based PKI." The principle is that each user (client) has a unique public key infrastructure (PKI) certificate stored on a server in the cloud. Users authenticate to the server (via passwords or one-time codes) and ask the server to sign messages on their behalf.

This design, however, does not allow a third party to confirm which signatures were genuinely produced by the user and which signatures resulted from an impersonation attempt (e.g., a malicious party authenticated to the certificate-storing server via the user's password). Since the server holds the user's certificate, it is possible that the server could have used the certificate to sign inauthentic messages (e.g., messages generated by the malicious party authenticated to the certificate-storing server via the user's password) on behalf of the user. Thus, a user could deny having authored a signed message by claiming that the signature had been applied by the server without the user's consent (e.g., by the malicious party with access to the user's password for the certificate-storing server).

Furthermore, even if the signing key (e.g., the key within the user's certificate) is derived from (e.g., via hashing) the user's password (e.g., by using a password-based key derivation function such as PBKDF2), the server—storing the password—could derive the same secret key and sign messages on behalf of that user. Even in a case where the server holds a (salted) one-way function of the password, a brute-force attack could allow the server to determine the correct secret key.

In an embodiment, the present invention provides a password-based authentication protocol in which users privately obtain the secret key of a fresh asymmetric key pair whereas the corresponding public key is learned by both the user and the server. If the key pair is used to sign messages from the client to the sever (e.g., the client signs messages via the secret key and the server verifies the signatures via the public key), the server can later demonstrate (e.g., prove) to a third party auditor that signed messages were genuinely produced by the user. Thereby, messages generated by the user are non-repudiable or, in other words, cannot be repudiated.

The embodiment enhances security of computer-networking authentication protocols (e.g., cryptographic protocols) in that malicious servers or other entities cannot (if certain conditions are satisfied as discussed below) fraudulently sign messages that were not produced by the user or authorized by the user (i.e., the malicious entities cannot sign messages on behalf of the user). As a result, users cannot (if the conditions are present) falsely disclaim signed messages. Accordingly, the authentication system protects against false electronic information and malicious devices by ensuring that messages are valid (e.g., authentic) and cannot be disclaimed as invalid (e.g., inauthentic). Therefore, the embodiment improves the security of computer networks and cryptographic communication protocols.

In an embodiment, the present invention provides a method for cryptographic key provisioning, the method including, via a main authentication server: generating a first secret key; registering a client by performing a first portion of a first instance of a distributed threshold oblivious pseudo-random function, the first instance of the function resulting in the client obtaining a root secret key and the main authentication server obtaining a corresponding root public key; and authenticating the client to the main authentication server by performing a first portion of a second instance of the distributed threshold oblivious pseudo-random function, the second instance of the function resulting in the client obtaining the root secret key. Information stored by the client, the first secret key, and a second secret key generated by a support authentication server are inputs to at least one of the first and second instances of the distributed threshold oblivious pseudo-random function.

In an embodiment, the main authentication server keeps the first secret key private such that neither the client nor the support authentication server receives the first secret key. In an embodiment, the support authentication server keeps the second secret key private such that neither the client nor the main authentication server receives the second secret key.

In an embodiment, the main authentication server performs the first portion of the first instance of the function in conjunction with the client and the support authentication server has, prior to the authenticating, performed a second portion of the first instance of the function in conjunction with the client. In an embodiment, during the authenticating, the support authentication server performs a second portion of the second instance of the function, and the information stored by the client, the first secret key, and the second secret key are inputs to both the first and second instances of the distributed threshold oblivious pseudo-random function.

In an embodiment, the first instance of the function results in the support authentication server obtaining the corresponding root public key. In an embodiment, the main authentication server receives, from the client, at least a portion of a fresh asymmetric key pair that has been signed by the client and verifies, with the corresponding root public key, the signature.

In an embodiment, the client has created the fresh asymmetric key pair based on randomness supplied by the main authentication server and has signed the at least a portion of the fresh asymmetric key pair with the root secret key. In an embodiment, the fresh asymmetric key pair includes a fresh public key and a fresh private key, the client has signed the fresh public key with the root secret key, and has transmitted the signed fresh public key to the main authentication server.

In an embodiment, after registration and before authentication, the client has cleared the root secret key from memory, the root secret key obtained during registration being equal to the root secret key obtained during authentication. In an embodiment, the information stored by the client includes a user password.

In an embodiment, the fresh asymmetric key pair is computed based on randomness supplied by the client and randomness supplied by the main authentication server. In an embodiment, the root public key obtained by the main authentication server has been certified with a digital signature belonging to the support authentication server so that the fresh asymmetric key pair is unambiguously bound to the user.

In an embodiment, the main authentication server generates the first secret key in response to receiving one or both of a user id and a first output based on a hash of the information stored by the client. In an embodiment, the main authentication server computes a second output based on the first secret key and transmits the second output to the client; and the root secret key obtained by the client during the authentication is based on the information stored by the client, the second output, and a third output computed by the support authentication server based on the second secret key.

In an embodiment, the present invention provides a tangible, non-transitory computer-readable medium having instructions thereon which, upon being executed by one or more processors, alone or in combination, provide for execution of any of the methods disclosed herein.

In an embodiment, the present invention provides a main authentication server including one or more processors, which alone or in combination, are configured to provide for performance of a method for cryptographic key provisioning. In an embodiment, the method includes, via the one or more processors of the main authentication server: generating a first secret key; registering a client by performing a first portion of a first instance of a distributed threshold oblivious pseudo-random function, the first instance of the function resulting in the client obtaining a root secret key and the main authentication server obtaining a corresponding root public key; and authenticating the client to the main authentication server by performing a first portion of a second instance of the distributed threshold oblivious pseudo-random function, the second instance of the function resulting in the client obtaining the root secret key. In an embodiment, information stored by the client, the first secret key, and a second secret key generated by a support authentication server are inputs to at least one of the first and second instances of the distributed threshold oblivious pseudo-random function.

As discussed above, an embodiment of the present invention addresses security risks in computer-networking authentication by providing a cryptographic signature scheme such that user messages cannot be disclaimed (i.e., repudiated by the user). In an embodiment, the present invention enables clients, by using a password, to create an asymmetric key-pair for signature schemes based on the discrete log assumption. This is advantageous in applications such as online banking or IoT.

In online banking, for example, an embodiment of the present invention enables the banking server (e.g., a main server) to authenticate the client's messages so that the client cannot disclaim such messages in front of a third party, such as an independent processing system belonging to an authority (e.g., a governmental authority such as a court).

In IoT systems, an embodiment of the present invention ensures that data within a report sent by a client (e.g., a sensor on a vehicle, a mobile device, or an appliance) was authentically generated by the device that purports to be the author of the report. In an embodiment, the main server (e.g., the banking server or a central server for controlling IoT systems) cooperates with a support server during user registration and authentication. Various features in this scenario have analogs to current federated authentication scenarios or multi-factor authentication scenarios where multiple servers cooperate to authenticate a user.

In an embodiment, the user account is bound to the user's identity via one or more (e.g., multiple) mechanisms (e.g., during registration of the user's account with the servers). For example, the user account can be associated with a national identifier (ID) if a user has an electronic ID (eID) document capable of digitally signing transactions and the one or both of the main server and the support server challenges the user to sign at least part of the registration transcript. Alternatively, or in addition, the user account can be associated with an email address or phone number and one or both of the servers challenges the user (e.g., during registration) to prove ownership of that email address or phone number (e.g., by sending, via email or text/SMS message, a one-time code that the user must provide. Registration can thus result in a user having a username and password unique to the servers.

In some embodiments, the user is a processing system such that the user account is bound to the processing system's identity through other an unique identification (e.g., via a unique serial number associated with the processing system; a key stored on the processing system in, for example, read-only memory; a unique electronic address assigned to the processing system)

During authentication, a registered user with username and password, and the two servers (e.g., main server and support server), each holding a secret key (e.g., a key share, as discussed below), engage in an interactive protocol with the user, who possesses (e.g., controls, has dominion over) a client device. When the user is a processing system, the client device can be an aspect thereof (e.g., a sensor of the processing system, a computing module of the processing system, etc.). At the end of the interactive protocol, the client obtains a key-pair including a secret key and public key (sk, pk respectively), whereas the main server obtains the public key pk. The client can apply the secret key sk to send authenticated messages (e.g., signed messages) to the main server. The main server can apply the public key pk to confirm message authenticity (e.g., authenticity of the signatures and thus the underlying substantive content of the signed messages).

The protocol is auditable such that in case of dispute, the main server can demonstrate to a third-party auditor (e.g., a third-party processing system) that only the client (e.g., the user) could have produced signatures that verify with the public key pk. In other words, messages sent (and signed) by the client are non-repudiable. The security of the protocol ensures that, unless all servers (e.g., both the main and support servers) are malicious, no party except the user could have derived an asymmetric key-pair where the public key pk is attributed to the user.

Thus, an auditor that receives evidence of a public key pk belonging to a given user (e.g., a message with a signature that the public key pk verifies), can conclude that only the user knows the corresponding secret key sk (and thus only the user could have generated messages signed with the secret key sk), unless all servers (e.g., both servers) are malicious. In other words, if the auditor trusts that at least one of the main server and the support server is honest, then the auditor can confirm that a signed message verifiable with public key pk was produced with secret key sk.

In an embodiment, the client, one or both of the main and/or support servers, and/or the auditor, alone or in combination, are configured to perform the following zero-knowledge proof of knowledge of a discrete logarithm:

Let G be a cyclic group of prime order p with generator g. A zero-knowledge proof of knowledge of x such that $y=g^x$ is a two party protocol between a prover P (e.g., the client) and a verifier V (e.g., the main server or the auditor) where the prover P has private input x and both parties have public input G, g, p, y. In an embodiment, private input x is a generic description of a zero-knowledge proof of a discrete log. Thus, private input x can be the client's randomized contribution to the final secret key. In an embodiment, "G" is a cyclic group, "p" is the cyclic group's order, "g" is a generator of "G", and "y" is configured such that $y=g\hat{\ }x$ for an x that only the prover knows. Parameters G, g, and p can be agreed upon by client and one or both of the servers, whereas "y" can be computed by the client (given its knowledge of "x") and revealed to the server. The final public key can be $pk=g\hat{\ }sk$ for a random sk.

Figure 2:
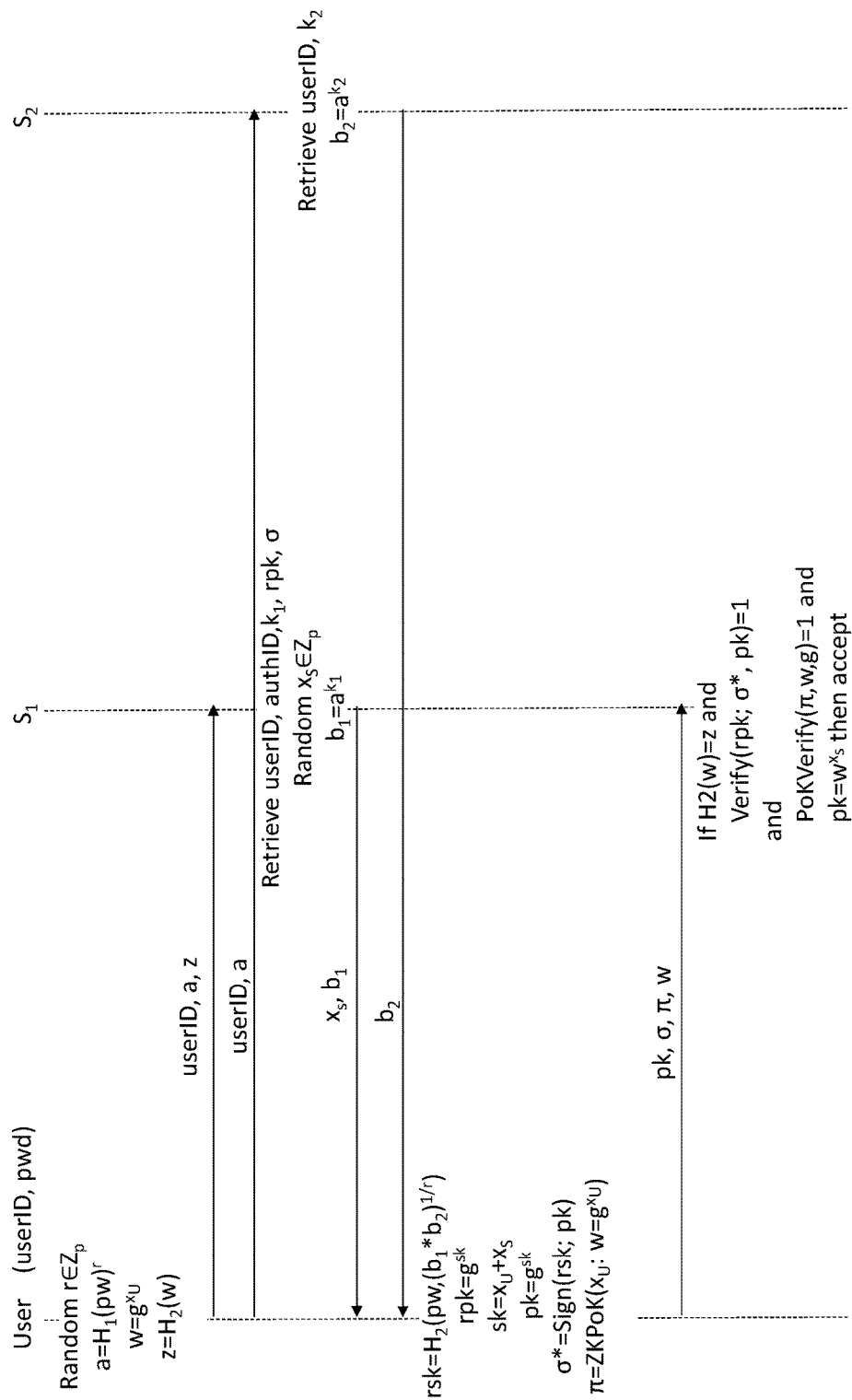
FIG. 2 illustrates a method for authentication according to an embodiment of the present invention.

The protocol can operate as follows: Prover P picks random (e.g., pseudo-random) $r \in Z_p$ and sends $a=g^r$ to verifier V. The verifier V picks a random $c \in Z_p$ and sends it to P. Finally, prover P computes $s=r+c*x$ and sends it to the verifier V. The verifier V accepts (e.g., accepts the proof such that it is convinced that the prover knows x such that $y=g^x$) only if $g^s$ is equal to $a*y^c$. In an embodiment, "$Z_p$" is the set of [1, ... p−1] where p is prime. In FIG. 2, the whole proof is denoted as "π".

An embodiment of the present invention applies threshold oblivious pseudo-random functions as described below:

A pseudo-random function (PRF) family is a collection of functions such that no polynomial-time algorithm A with access to an oracle computing the function over inputs chosen by the algorithm A, could distinguish with significant advantage between the scenario where the oracle uses a function chosen at random from the PRF family and the scenario where the oracle uses a truly random function. Given a PRF family, an oblivious PRF is an interactive two party protocol between a client C with private input x and a server S (e.g., one or both of the main server and the support server) with private input k, so that at the end of the interaction, the client learns $y=F_k(x)$ but nothing about k, whereas the server learns nothing about x. In an embodiment, k is the index of the function within the function family.

A (t,n) threshold oblivious PRF (TOPRF) is an interactive protocol between a client C with private input x and n servers $S_1, \ldots, S_n$ each with a share of private input k, so that the client interacts with a subset S of the servers in $S_1, \ldots, S_n$ (e.g., the main and support servers) and learns $y=F_k(x)$ only if the size of subset S is above a pre-defined threshold t. Accordingly, client C learns nothing about k, nor does the client C learn anything about any share of k held by any of the servers; further, no server learns anything about x. Stanislaw Jarecki, et al., "TOPPSS: Cost-minimal Password-protected Secret Sharing based on Threshold OPRF," ACNS (2017), which is hereby incorporated by reference herein, describes an efficient TOPRF, which is reviewed in the following by an instantiation that only uses two servers $S_1$ and $S_2$, i.e., n=t=2.

Let G be a cyclic group of prime order p, let $H_1$ and $H_2$ be two hash functions, each mapping arbitrary strings to G. Let the secret input of the servers (e.g., the main and support servers) be $k \in Z_p$ and assume it to be shared such that $k=k_1+k_2$ (i.e., k is based on $k_1$ and $k_2$) where $k_1$ is private to server $S_1$ (e.g., one of the main and primary server) and $k_2$ is private to server $S_2$ (e.g., the other of the main and primary server). The client, on private input x (e.g., the user's password), picks r uniformly at random from $Z_p$ and sends $a=H_1(x)^r$ to both servers $S_1$ and $S_2$. On receipt of message a from the client, server $S_i$ (i=1, 2) computes $b_i=a^{k_i}$ and sends the same to the client. On reception of message $b_1$ from $S_1$ and message $b_2$ from $S_2$, the client outputs $y=H_2(x,(b_1*b_2)^{1/r})$. In an embodiment, rsk=y.

Referring to FIG. 1, an embodiment of the present invention includes setup (also called "registration") in which user U (e.g., via a client controlled by user U) interacts with a main server $S_1$ (also called a "first server" or "first authentication server") and a support server $S_2$ (also called a "second server" or "second authentication server"). Further, an auditor A (also called a "third server") exists that is configured to resolve a dispute between the main server $S_1$ and a user U. The auditor A and the two servers can communicate via authentic channels by, for example, means of a digital signature scheme where each party has pre-stored the public key of the other two. Given a digital signature scheme, let $PK_1$, $PK_2$ and $PK_A$ be the public keys of main server $S_1$, support server $S_2$, and auditor A. Similar to above, let G be a cyclic group of prime order p with generator g, let $H_1$, $H_2$ be a hash functions that map arbitrary strings to G. The main server and/or the auditor A can function as a verifier V, as further discussed below.

An embodiment includes registration as depicted in FIG. 1. Upon registration, user U picks a unique userID (e.g., a username) and a password pw (also called "pwd"). Each server $S_i$ (i=1, 2) picks a random key $k_i$ from $Z_p$. In an embodiment, each server picks a random key $k_i$ (also called a "key share") such that an aggregation (e.g., sum) of their respective keys is equal to k. This is different than predetermining k and then having each server pick $k_i$ such that their respective sums are equal to k. Aggregation/summing can occur when each key share $k_i$ is added. For example, if $k_1=53$ and $k_2=57$, an aggregation/sum of $k_1$ and $k_2$ can be 110 (i.e., addition).

The user U sends userID (e.g., the client of user U sends userID) to both servers $S_1$ and $S_2$. In addition, the user can send $a=H_1(pw)^r$, where $H_1$ is a hash function (e.g., a hash function known to both servers) and r is randomly selected such that $r \in Z_p$. In an embodiment, $Z_p$ is the set of [1, ... p−1] where "p" is prime. In an embodiment, all numbers in the set of $Z_p$ are prime. Next, the user U and the two servers $S_1$ and $S_2$ engage in a TOPRF protocol, for example as described in Stanislaw Jarecki, et al., incorporated by reference above, where the private inputs of the user U and the servers $S_1$, and $S_2$ are pw, $k_1$, and $k_2$, respectively.

At the end of the protocol, user U learns $y=F_k(pw)$ where $k=k_1+k_2$. At this time, the user U sets root secret key risk rsk=y and computes the corresponding root public key $rpk=g^{rsk}$. The user sends the root public key rpk to both servers $S_1$ and $S_2$. User U stores the password pw and userID (e.g., the client locally stores the same). In an embodiment, "g" is a generator of the group "G" and represents a set of public parameters agreed upon by the client, one or both of the servers, and/or the verifier.

The last message from user U to the server (i.e., the one containing root public key rpk) is, in an embodiment, authenticated by an authentication mechanism mutually recognized by the two servers $S_1$ and $S_2$. This is depicted in FIG. 1 by "authID". For example, if user U holds an electronic identity card enabled to digitally sign documents, the user U may digitally sign the root public key rpk and thus authID would be the digital signature produced by using the user's eID. Otherwise, each of the two severs $S_1$ and $S_2$ can send a secret code to the phone number or email address (e.g., a unique electronic address) of the user U (e.g., to the client of user U) and ask the user U to return the code in order to verify the user's possession of the email address of phone number (e.g., the unique electronic address). In this case, authID would be a one-time code.

If the support server $S_2$ verifies the user identity by, for example, one of the above mechanisms, the support server $S_2$ digitally signs <userID, authID, rpk> as received by the user U and provides the signature σ to the main server $S_1$ (e.g., by way of user U). Finally, the main server $S_1$ stores the tuple <userID, authID, $k_1$, rpk, σ> in a respective user database (memory), whereas the support server $S_2$ stores <userID, $k_2$> in a respective user database (memory). The support server need not store rpk or authID. The main server and the support server can store a respective tuple for each of a plurality of users.

FIG. 1 depicts a registration protocol. An embodiment includes authentication (e.g., post-registration authentication). An embodiment of an authentication protocol is illustrated in FIG. 2. The root secret key rsk and root public key rpk computed during the authentication protocol of FIG. 2 can be equal to the root secret key rsk and root public key rpk computed during the registration protocol of FIG. 1. In an embodiment, each user only needs to register once.

After registration, the user can engage in the authentication protocol multiple times (e.g., indefinitely). For example, the authentication protocol can automatically occur each time a previously registered user wishes to send a signed message. In embodiments where the root secret key rsk and root public key rpk computed during the authentication protocol of FIG. 2 are equal to the root secret key rsk and root public key rpk computed during the registration protocol of FIG. 1, the user (e.g., the user's client) can delete (clear) the root secret key rsk and root public key rpk from memory after the registration protocol and after the authentication protocol to enhance security.

As shown in FIG. 2, when the user U wishes to authenticate to the main server $S_1$ and to generate a fresh asymmetric key pair, the three parties (user U and the servers $S_1$ and $S_2$) engage in the following protocol: User U sends the userID to both servers $S_1$ and $S_2$. The main server $S_1$ retrieves <userID, authID, $k_1$, rpk, $\sigma$> from its respective user database, whereas support server $S_2$ retrieves <userID, $k_2$> from its respective user database.

Next, user U picks a random $x_U$ from $Z_p$, computes $w=g^{x_U}$ and sends $z=H_2(w)$ to server $S_1$. In addition, the user can supply $a=H_1(pw)^r$, where $H_1$ is a hashing function known to both servers and r is randomly selected such that $r \in Z_p$ The three parties now engage in the TOPRF protocol where private inputs are pw, $k_1$, and $k_2$, for user U, server $S_1$, and server $S_2$, respectively. At the end of the interaction, user U learns the root secret key $rsk=F_k(pw)$ where $k=k_1+k_2$ (i.e., k is based on $k_1$ and $k_2$). The root secret key rsk obtained during this authentication protocol can be equal to the root secret key rsk obtained during the registration protocol of FIG. 1.

Main server $S_1$ picks random $x_S$ from $Z_p$ and sends $x_S$ to the user U. User U computes a fresh secret key sk as $sk=x_U+x_S$ and the corresponding fresh public key pk as $pk=g^{sk}$. User U uses the root secret key rsk to sign the fresh public key where $\sigma^*$ is the resulting signature.

User U sends pk, $\sigma^*$, w, $\pi$, where $\pi$ is a zero-knowledge proof of knowledge of the discrete logarithm of w in base g to main server $S_1$. Main server $S_1$ verifies that z matches $H_2(w)$, that $\pi$ is a valid proof of knowledge of the discrete logarithm of w in base g, that $\sigma^*$ is a valid signature of pk under rpk, and that $pk=w*g^{xs}$. If all checks are successful, main server $S_1$ accepts pk as a valid public key of user U (e.g., the main server accepts that public key pk forms an asymmetric pair with a secret key sk that only user U possesses). At this stage, user U may apply secret key sk to sign messages sent to the main server $S_1$ and the main server $S_1$ can verify those signatures by using the public key pk.

When the user is finished signing messages in a given session, the user U can clear the secret key sk from memory to enhance security. The user U can clear the root secret key rsk from memory (e.g., memory of the client) at the same time. Alternatively, the user U can immediately clear the root secret key from memory after secret key sk has been generated.

A session can end, for example, when the user U has been inactive for a certain amount of time (e.g., a software program applying secret key sk to sign messages on the client times-out). Alternatively, or in addition, a session can end when the main server decides to stop authenticating messages verified with public key pk (e.g., after a certain amount of time has elapsed since sk and pk have been generated). To begin a new session, the authentication protocol of FIG. 2 can automatically reoccur to generate a fresh asymmetric key pair sk, pk. The user U can automatically begin a new session each time a previous session has expired and software running on the client requires secret key sk to sign messages.

The method can further include auditing in case of a dispute. In this case, main server $S_1$ may want to demonstrate to a third-party auditor A that signatures that verify under the public key pk were produced by user U. To do so, main server $S_1$ can provide to auditor A the tuple <userID, authID, rpk, $\sigma$>. At this stage, auditor A confirms that $\sigma$ is a valid signature for <userID, authID, rpk> under public key $PK_2$, and that $\sigma^*$ is a valid signature for public key pk under the root public key rpk. If both checks are successful, auditor A concludes that the public key pk belongs to user U (e.g., that messages signed with secret key sk were authentically authored by user U).

Embodiments of the present invention provide a number of improvements and advantages. For example, a method for providing a non-repudiable message according to an embodiment of the present invention includes one or more of the following steps:

1) Using a threshold oblivious pseudo-random function between a user and a main server and a support server so that the user can retrieve a secret key (e.g., root secret key) from the user's password, whereas the corresponding public key (e.g., root public key) is known to the user and the main server. In an embodiment, the support server does not need to know the root public key.
2) Applying, by the user, the secret key retrieved by the user in step 1) to certify a fresh asymmetric key pair computed using randomness contributed by both the user and the main server.
3) Certifying the public key of step 1) with a digital signature produced by the support server so that the fresh asymmetric key pair of step 2) can be unambiguously bound to the user.

In an embodiment of the present invention, a method for user authentication includes one or more of the following steps:

1) Setting up two authentication servers, one main and one support, each with a secret key (e.g., each with a respective secret key such as $k_1$ and $k_2$ in FIG. 1).
2) Registering a user to the authentication servers by picking a password, running the threshold oblivious pseudo-random function between the user and the two servers so that the user obtains a root secret key, whereas the main server obtains the corresponding public key (e.g., root public key) certified by the support server.
3) Authenticating the user by running the threshold oblivious pseudo-random function (e.g., the same function applied in step 2) between the user, with a password as private input, and the two servers, each with their respective secret keys as private input, so that the user obtains a root secret key. In an embodiment, the root secret key of step 3 is the same root secret key of step 2. The root secret key can be used to authenticate a fresh key pair. In an embodiment, every time the user wishes to authenticate, the user retrieves the root secret key and uses the same to certify a fresh key pair.

The method can further include one or both of the following steps:

4) Applying, by the user, the root secret key to certify a fresh asymmetric key pair.
5) Verifying, by one of the servers, the validity of the certified fresh asymmetric key pair by using the root public key (i.e., based on the root public key).

Thus, embodiments of the present invention enable a client to generate an asymmetric key pair by using a password and advantageously ensures that no other party, without knowledge of the password, may have created the same key pair. In contrast, current password-based key derivation protocols allow for creation of a symmetric key, which is less useful than an asymmetric key in at least some digital signature applications.

The client can be one or more devices (e.g., a desktop, a laptop, a mobile phone, a smart-card, a sensor etc.) controlled by a user who wishes to interact with the servers. Any tasks that are described as be performed by the user can be understood as being, in an embodiment, performed by the client and vice-versa. In an embodiment, the user and client correspond to the same processing system. In an embodiment, one of the user and the client is a processing system (e.g., a processing system of a vehicle, a processing system for controlling home appliances, a processing system of a mobile device) and the other of the user and the client is an element of the processing system (e.g., a sensor such as a camera, a global-positioning system, an accelerometer, a temperature sensor, a pressure sensor, a motion sensor, etc.). The protocols disclosed herein cause the user and client to automatically cooperate to obtain secret key sk. The user/client apply secret key sk to sign messages containing sensor readings.

In an embodiment, the main server and the support server are independent platforms (e.g., processing systems) sequestered in different locations. The main server and the support server can be configured to exclusively communicate over the Internet (e.g., unconnected via any network other than the Internet). In an embodiment, the main server and the support server do not directly communicate. Instead, any information sent from the main server to the support server and vice-versa is routed through the client.

In an embodiment, the auditor is a platform (e.g., processing system) independent of the main server, the support server, and the client. The auditor can be configured to perform an activity (e.g., send a message to the client) after confirming that public key pk is asymmetrically paired with private key sk only known to the client. The message sent from the auditor to the client can be encrypted with public key pk such that only the client, with private key sk, is capable of decrypting the message.

Figure 3:
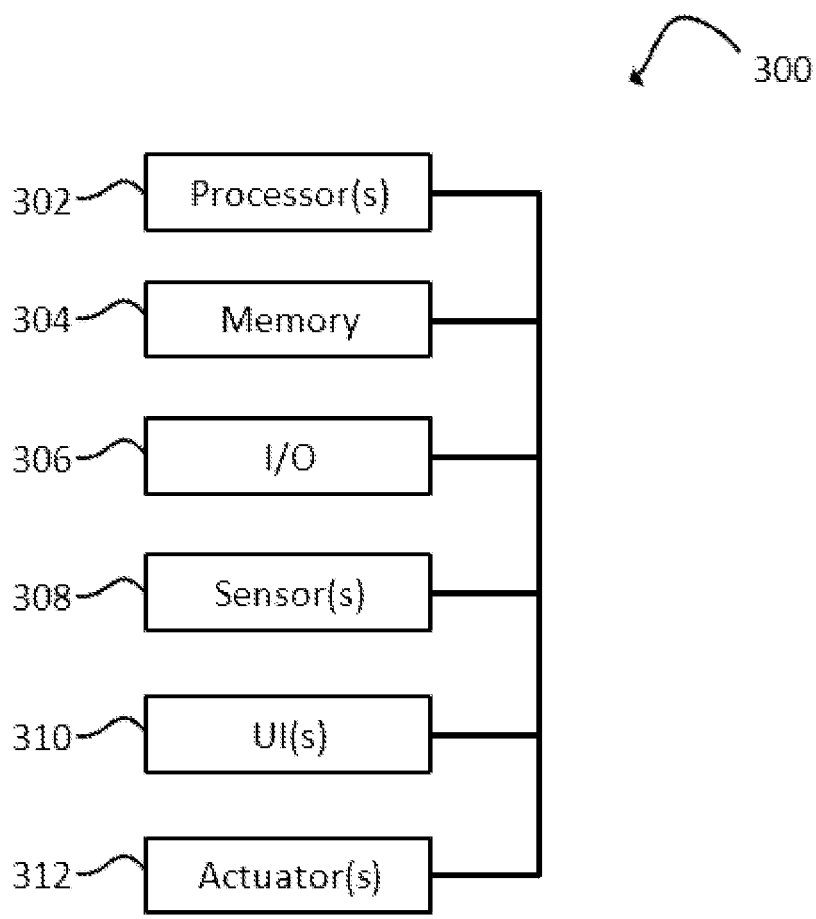
FIG. 3 is a block diagram of an exemplary processing system, which can be configured to perform any and all operations disclosed herein.

Referring to FIG. 3, a processing system 300 can include one or more processors 302, memory 304, one or more input/output devices 306, one or more sensors 308, one or more user interfaces 310, and one or more actuators 312. Processing system 300 can be representative of each computing system disclosed herein including one or more of (e.g., all of) user/client, the main server, the support server, and the auditor.

Processors 302 can include one or more distinct processors, each having one or more cores. Each of the distinct processors can have the same or different structure. Processors 302 can include one or more central processing units (CPUs), one or more graphics processing units (GPUs), circuitry (e.g., application specific integrated circuits (ASICs)), digital signal processors (DSPs), and the like. Processors 302 can be mounted to a common substrate or to multiple different substrates.

Processors 302 are configured to perform a certain function, method, or operation (e.g., are configured to provide for performance of a function, method, or operation) at least when one of the one or more of the distinct processors is capable of performing operations embodying the function, method, or operation. Processors 302 can perform operations embodying the function, method, or operation by, for example, executing code (e.g., interpreting scripts) stored on memory 304 and/or trafficking data through one or more ASICs. Processors 302, and thus processing system 300, can be configured to perform, automatically, any and all functions, methods, and operations disclosed herein. Therefore, processing system 300 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 300 can be configured to perform task "X". Processing system 300 is configured to perform a function, method, or operation at least when processors 302 are configured to do the same.

Memory 304 can include volatile memory, non-volatile memory, and any other medium capable of storing data. Each of the volatile memory, non-volatile memory, and any other type of memory can include multiple different memory devices, located at multiple distinct locations and each having a different structure. Memory 304 can include remotely hosted (e.g., cloud) storage.

Examples of memory 304 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 304.

Input-output devices 306 can include any component for trafficking data such as ports, antennas (i.e., transceivers), printed conductive paths, and the like. Input-output devices 306 can enable wired communication via USB®, DisplayPort®, HDMI®, Ethernet, and the like. Input-output devices 306 can enable electronic, optical, magnetic, and holographic, communication with suitable memory 306. Input-output devices 306 can enable wireless communication via WiFi®, Bluetooth®, cellular (e.g., LTE®, CDMA®, GSM®, WiMax®, NFC®), GPS, and the like. Input-output devices 306 can include wired and/or wireless communication pathways.

Sensors 308 can capture physical measurements of environment and report the same to processors 302. User interface 310 can include displays, physical buttons, speakers, microphones, keyboards, and the like. Actuators 312 can enable processors 302 to control mechanical forces.

Processing system 300 can be distributed. For example, some components of processing system 300 can reside in a remote hosted network service (e.g., a cloud computing environment) while other components of processing system 300 can reside in a local computing system. Processing system 300 can have a modular design where certain modules include a plurality of the features/functions shown in FIG. 3. For example, I/O modules can include volatile memory and one or more processors. As another example, individual processor modules can include read-only-memory and/or local caches.

Embodiments of the invention are further described below. An embodiment relates to auditable asymmetric password authenticated public key establishment.

1. Overview

As discussed above, non-repudiation of messages generated by users is a desirable feature in a number of applications ranging from online banking to IoT scenarios. However, it requires certified public keys and often results in poor usability as a user must store a certificate (e.g., in memory of the client device such as in a smart-card). A user-friendly alternative is to have a "cloud-based" PKI. As an overview, each user has a PKI certificate stored at a server in the cloud; users authenticate to the server—via passwords or one-time codes—and ask the server to sign messages on the users' behalf. As such, there is no way for the server to prove to a third party that a signature on a given message was authorized by a user as opposed to a third-party with the user's password. Further, because the server stores the user's certified key, the server may have signed arbitrary messages in an attempt to impersonate that user. In other words, a user could deny having signed a message, by claiming that the signature was produced by the server without consent. The same holds in case the secret key is derived deterministically from the user's password, for the server, by knowing the password, may still impersonate the user.

An embodiment provides a "password-only" solution to non-repudiation of user messages by introducing Auditable Asymmetric Password Authenticated Public Key Establishment ($A^2PAKE$). This is a PAKE-like protocol that generates an asymmetric key-pair where the public key is output to every participant, but the secret key is private output to just one of the parties (e.g., the user). Further, the protocol can be audited, i.e., given the public key output by a protocol run with a user, the server can prove to a third party that the corresponding secret key is held by the specific user. Thus, if the user signs a message with that secret key, then the message is non-repudiable. Provided is a universally composable construction of $A^2PAKE$ and an instantiation based on a distributed oblivious pseudo-random function.

Non-repudiation in online applications is often based on digital signatures and PKI certificates. Given that most servers hold a PKI certificate, non-repudiation of messages generated by a server can be achieved. The same is not true for messages sent by users, since users often authenticate to servers using only-entropy passwords (non-repudiation of users messages would be trivial to achieve if users had PKI client certificates; however, PKI client certificates hinder the user experience—as users can only connect to the server from devices where the certificate is installed).

However, non-repudiation of user messages is a desirable property in a number of scenarios. For example, in an online banking application, the banking server may ask the user to authenticate requests to, e.g., transfer funds to other accounts; later on, in case of dispute, the server may wish to prove to a third party (e.g., in court) that the user had indeed requested a specific operation. Similarly, in IoT applications the processing server may wish to pinpoint the owner of the device that produced a specific data report.

A solution leverages "cloud-based PKI" where each user has a PKI certificate stored at a server in the cloud; users authenticate to the server—via passwords or one-time codes—and ask the server to sign messages on their behalf. This design is used by a number of companies and national administrations. This design, however, does not allow a third party to tell which signatures were genuinely produced by the user and which were the result of an impersonation attempt by the server or a malicious third-party with the user's password. Since the server holds the user's certificate and could sign any messages on his behalf, that user could deny having signed a message, e.g., by claiming that the signature was produced by the server without consent.

This issue arises even if the signing key is derived from the user's password (e.g., by using the PBKDF2 key-derivation function). The server—by storing the password—may derive the same key and sign messages on behalf of a user. Similarly, if the server holds a (salted) one-way function of the password, a brute-force attack allows the server to derive the correct key.

Password-authenticated key exchange (PAKE) allows two parties to authenticate and jointly establish a strong cryptographic key by relying solely on a common password. However, PAKE protocols deal with symmetric keys and are thus ill-suited for certain applications—since knowledge of the symmetric allows any of the two parties to authenticate messages on behalf of the other.

Solving the problem of non-repudiation for users that only use passwords can include a PAKE-like protocol that generates an asymmetric key-pair where the public key is public output, but the secret key is private output to one of the parties. Non-repudiation is relevant for auditability, i.e., when third parties can attribute messages to their senders.

Thus, an embodiment provides that the party receiving only the public key to be able to prove that the corresponding secret key must have been generated by its peer. That is, given a transcript T of a client-server protocol where the client C receives a key-pair sk, pk (secret key and public key respectively) and the server S only learns the public key pk, an embodiment provides that the server is able to prove to a third party that only C could possibly know the secret key sk matching (e.g., asymmetrically pairing with) the public key pk output by T.

Auditing a transcript—i.e., attributing a public key to an identity—often requires establishing and verifying user "identities". An embodiment provides identity creation and management for users. For example, if users hold eIDs, the one of the registering user can be verified at registration time and bound to his new account. Later on, during auditing, a public key can be attributed to the holder of the ID used during registration. This is the identity bootstrapping mechanism that asks user to sign the registration transcript with their eID (by using a smart-card reader attached to a PC). Another option would be for users to register with a unique electronic address (e.g., an email address): during registration, the user must prove ownership of an email address (e.g., by receiving a one-time code in his inbox) and the new account must be bound to that email address. During auditing, a public key can be attributed to the holder of that email address used during registration. In a similar fashion, identities can be verified by means of mobile phone numbers (e.g., one-time codes sent via text messages).

In an embodiment, a third party can be convinced that a particular public key was created by a user only if the server cannot frame users by creating key-pairs on the users' behalf. If key-pairs are generated from passwords, an embodiment ensures that only users know their full passwords; yet the embodiment still (i) allows the server to authenticate users, and (ii) prevents the server from mounting offline brute-force attacks.

An embodiment splits the password among several servers with the goal of mitigating password leaks due to a server breach. Therefore, an embodiment introduces multiple servers to authenticate users, so that unless all servers are malicious, they cannot frame a user (e.g., by running an offline brute-force attack to recover his password). In the two-server scenario, a "main" server obtains the public key as output of the protocol, and may later on turn to a third party for auditing purposes—i.e., to prove that the public key belongs to a specific user—while a "secondary" server (also called a "support server") supports its peer main server in authenticating users and cooperates to produce auditing evidence. As long as one of the servers is honest, third parties can pinpoint public keys output by the protocol to the user that engaged in the execution.

An embodiment formally provides a cryptographic protocol with the above properties for the two-server scenario, called $A^2PAKE$. An embodiment practices an ideal functionality of $A^2PAKE$ that captures the security requirements of non-repudiation of the keys generated by a user and non-frameability from malicious servers. Further, an embodiment provides a protocol that realizes the functionality of $A^2PAKE$ and proves it secure in the universal composability framework of Canetti. A key ingredient of an embodiment of the protocol is a distributed oblivious pseudo-random function. An embodiment introduces a prototype implementation written in Python. Provided are the results of an evaluation carried out to assess throughout, latency, and communication overhead.

2. Password-Based Cryptography Overview

The basic idea of password-based cryptography is to design protocols with strong cryptographic guarantees by relying solely on low-entropy passwords.

The PKCS #5 standard shows how to use passwords to derive symmetric keys to be used for (symmetric) encryption or message authentication. Password-Authenticated Key Exchange (PAKE) enables two parties, holding the same password, to authenticate mutually and to establish a symmetric key. In the client-server settings, compromise of the password database at the server may be mitigated by splitting passwords among multiple servers. Threshold PAKE (TPAKE) borrows from threshold-based cryptography and distributes the authentication functionality across n servers in a way such that the client authenticates successfully only if it cooperates with at least t<n servers. Passwords are not leaked as long as the adversary compromises t−1 or less servers. Most TPAKE protocols allow the client to establish pairwise-independent keys with each of the servers.

Password-Authenticated Public-Key Encryption (PAPKE) enhances public-key encryption with passwords. In particular, generation of a key-pair is bound to a password and so is encryption. Hence, decryption of a ciphertext reveals the original message only if the password used at encryption-time matches the one used when the key-pair was generated. Thus, PAPKE preserves confidentiality despite a man-in-the-middle that replaces the public key of the receiver (as long as the adversary does not guess the receiver's passwords when generating its public key).

Password-based signatures have been proposed in where the signature key is split between the user and a server and the user's share is essentially his password—so that the user can create signatures with the help of the server. The server does not authenticate users and that it could recover the full signing key of any user by brute-forcing the password. User authentication and resistance to brute-force attacks for password-based signatures were introduced in, that requires users to carry a personal device such as a smart card.

Passwords-hardening services enable password-based authentication while mitigating the consequences of password database leak. The idea behind password-hardening services is to pair the authentication server with a "cryptographic service" that blindly computes (keyed) hashes of the passwords. The password database at the authentication service stores such hashes so that a leak of the database does not reveal passwords, unless the key of the cryptographic service is compromised.

PASTA proposes password-based threshold token-based authentication where the role of an identity provider in a protocol such as OAuth (https://oauth.net/) is distributed across several parties and the user obtains an authentication token only by authenticating to a threshold number of servers.

Password-Protected Secret Sharing (PPSS) allows user to securely store shares of a secret—e.g., a cryptographic key—on a set of servers while reconstruction is only feasible by using the right password or by corrupting more than a given threshold of servers. There are important differences between embodiments of $A^2PAKE$ and PPSS. First, PPSS does not solve the problem of user authentication. Further, in an embodiment, $A^2PAKE$ provides forward security—leakage of a password does not compromise past sessions—and outputs high entropy keys despite a malicious client or server. Also, compromise of the PPSS servers immediately reveals the user password: if all $A^2PAKE$ servers are compromised, in an embodiment, a brute-force attack is still required to learn the password—therefore high-entropy passwords may still offer security. Finally, an embodiment embeds auditability in the $A^2PAKE$ functionality whereas it is not clear how to make PPSSS auditable by a third-party.

3. $A^2PAKE$ 3.1 the Universal Composability Model

Basic features of the Universal Composability model (also called "Canetti") are reviewed. In general terms, a protocol Π UC-realizes an ideal functionality $\mathcal{F}$ with setup assumption $\mathcal{G}$ if there exists a PPT simulator S such that no PPT environment $\mathcal{Z}$ can distinguish an execution of the protocol Π which can interact with the setup assumption $\mathcal{G}$ from a joint execution of the simulator S with the ideal functionality $\mathcal{F}$. The environment $\mathcal{Z}$ provides the inputs to all the parties of the protocols, decides which parties corrupt (considered is static corruption, where the environment decides the corrupted parties before the protocol starts), and schedules the order of the messages in the networks. When specifying an ideal functionality, the "delayed outputs" terminology of Canetti is used. Namely, when a functionality $\mathcal{F}$ sends a public (resp. private) delayed output M to party $P_i$, an embodiment is configured such that M is first sent to the simulator (resp. the simulator is notified) and then forwarded to $P_i$ only after acknowledgment by the simulator.

3.2 Ideal Functionality

An embodiment of the ideal functionality $\mathcal{F}_{A^2PAKE}$, presented in TABLE 1, is described. As indicated above, a "client" includes one or more devices controlled by a specific "user". The client is thus configured to perform and implement any functions that the "user" is described to perform. An embodiment provides a number of clients $\{C_1, \ldots, C_n\}$, and two non-colluding servers $S_1$, $S_2$. The ideal functionality can be extended more than two servers, obtaining security as long as one of the servers is honest (i.e., not malicious); however, the exemplary case of two servers is described for simplicity.

The server $S_1$, is designated as the "main" server. It is the server that learns the client's key—so it can verify messages signed by the client—that turns to an auditor in case of dispute. The other server $S_2$ is designated as "support" server (also called the "secondary server") and is configured to help the main server authenticate users and, importantly, to produce auditing evidence. In an alternative embodiment, both servers learn the client's public key and can later request auditing.

At registration, each client can submit its password to the ideal functionality, which registers it. Even if both servers are corrupted, the password is not leaked. In an embodiment, the only way for an attacker to leak the password is by using the "test password" interface. The ideal functionality notifies both servers whenever the adversary tests a new password, therefore: (i) if at least one of the server is honest, then only "online" brute-force attacks on the password are possible; (ii) if both servers are corrupted, then the attacker can carry on "off-line" brute-force attack on the password.

In an embodiment, the latter property requires the simulator of the protocol, playing the role of the ideal-model adversary, to be able to detect off-line password tests made by the real-world adversary. However, when both the servers are corrupted, the adversary can carry on the tests locally, namely without sending any message. Thus, an embodiment involves a non-black-box feature that allows the simulator to extract a password test from adversary. An embodiment will follow a strategy similar by making use of the random oracle model to obtain such extractability property.

In an embodiment, the ideal functionality is configured to output a fresh keypair at every run, so to achieve forward-secrecy—namely, the leakage of a password does not compromise the secret keys output by earlier executions. Moreover, as long as either the client $C_j$ or the server $S_1$ is honest (e.g., generation of the key pair can only involve the client and server $S_1$) and the password was not leaked, i.e., corrupt(sid, j)≠1, the ideal functionality provides correctness, namely, the public key received by the server corresponds to the secret key received by the client. In an embodiment, the ideal functionality registers the key-pair in the database of key-pairs only when the servers $S_1$ is honest. When the server is corrupted, it can always deny to have executed the protocol.

Finally, the ideal functionality ensures non-frameability and non-repudiability. For the former, an auditor cannot be convinced that a public key belongs to an honest client if that client did not actually produce the key-pair jointly with the servers. This holds as long as the password of the client is not corrupted. Both servers could be malicious but still cannot frame the client, if, for example, the password of the client has high-entropy. For non-repudiability, an honest server with a transcript of an execution with a (possibly malicious) client, can convince the auditor that the secret key matching the public key in the transcript belongs to that client.

4. UC-Secure Protocol
4.1 Setup

An embodiment leverages functionalities $\mathcal{F}_{AUTH}$, $\mathcal{F}_{KRK}$, $\mathcal{F}_{RO}$ and $\mathcal{F}_{CRS}$, which model authenticated channels, key-registration, random oracle, and common reference string, respectively.

Further, an embodiment leverages the ideal functionality $\mathcal{F}_{TOPRF}$ that realizes a (2, 2)-threshold Oblivious PRF. Code for implementing an embodiment of the ideal functionality $\mathcal{F}_{TOPRF}$ appears in TABLE 2. See Jarecki et al., incorporated by reference above.

An embodiment of $\mathcal{F}_{TOPRF}$ produces uniformly random outputs, even in case of adversarial choice of the involved private key (shared by the two servers). It maintains a table T(•, •) storing the PRF evaluations and a counter vector tx(•) for each server, used to ensure the involvement of the two servers on each completed evaluation. An embodiment makes use of the multi-session extension of the ideal functionality $\mathcal{F}_{TOPRF}$, as follows.

When invoking the functionality an embodiment includes a sub-session identifier ssid in such a way that whenever the hatted functionality $\hat{\mathcal{F}}_{TOPRF}$ is queried on input (sid, ssid, m), it first checks whether there is a running (e.g., executing, instantiated) copy of $\mathcal{F}_{TOPRF}$ with session identifier ssid and, if so, activates (e.g., engages) that copy with message m. Otherwise, it invokes a new copy of $\mathcal{F}_{TOPRF}$ with input (ssid, m), and links to this copy the subsession identifier ssid. In an embodiment, (see, e.g., TABLE 1, TABLES 3-5, FIG. 4, and FIG. 5) there are two layers of executions, namely, the client's index (j) plays the role of the ssid, while for each client considered are different independent queries to the same function (i.e., for a fixed key) tagged with a query label: qid.

4.2 Description of Protocol

A description of a protocol realizing $\mathcal{F}_{A^2PAKE}$ from the setup features $\mathcal{F}_{RO}$, $\mathcal{F}_{AUTH}$, $\mathcal{F}_{KRK}$, $\mathcal{F}_{TOPRF}$ and $\mathcal{F}_{CRS}$ follows with reference to TABLES 3-5. In an embodiment, these functions are ideal functionalities of cryptographic primitives. $F_{AUTH}$ can be an authenticated channel. It can be instantiated, for example, by a digital signature scheme where the sender has a key-pair and the receiver has the corresponding public key. $F_{KRK}$ can be a key registration function. It could be instantiated by a bulletin board where public keys are matched to identities. $F_{RO}$ can be a random oracle and can be instantiated with hash functions. $F_{CRS}$ can be a common reference string function and can be instantiated by a trusted authority picking public parameters.

In an embodiment, the protocol includes (e.g., consists of) three phases: (i) registration, in which the client registers with the two servers $S_1$ and $S_2$; (ii) authentication, in which the client and the server $S_1$ produce a fresh and authenticated key pair, and (iii) audit, in which the server can prove to the auditor the relation between clients and public keys.

At registration of a new client, the servers initialize a new fresh instance of $\mathcal{F}_{TOPRF}$ (which in an embodiment of the protocol is translated to sampling a pair of secret keys shares for the TOPRF protocol). Then, the client and the two servers run $\mathcal{F}_{TOPRF}$, where the client's private input is the password whereas each server uses its secret key share (e.g., additive share of a total or aggregate secret key) as a private input. The client receives the evaluation of the OPRF that is parsed as a secret key sk*∈$\mathbb{Z}_q$ for a DLOG-based signature schemes. Other embodiments of the protocol could use any EUF-CMA secure signature scheme. Finally, the client, applying the interfaces provided by $\mathcal{F}_{AUTH}$, can send an authenticated message to both servers with the public key pk*=$g^{sk*}$. In an embodiment, using the $\mathcal{F}_{AUTH}$ setup assumption for the last step is necessary, to bind a client identity with public key pk*. Also, the server $S_2$ signs the public key pk* produced, thus witnessing the successful registration of the client.

During authentication, a registered client and the two servers run again the instance of the $\mathcal{F}_{TOPRF}$ associated with the client. Once again, the secret input of the client is a password whereas each server inputs the secret key share determined during registration. Thus, the client recovers the secret key sk*. Concurrently, client and server can run a coin-tossing protocol (e.g., a randomized protocol) to produce a DLOG key pair. Such protocol ensures randomly generated keys. Additionally, the last message of the client, which identifies uniquely the key-pair, is authenticated with a signature under the key pk*.

At auditing time, if server $S_1$ wants to demonstrate that a public key pk belongs to a client $C_j$, the server can provide, to the auditor, (1) the signature received by $S_2$ at registration time on pk* and the client's identity j, and (2) the signature received by the client at authentication time on pk.

4.3 Instantiation

We now describe an instantiation (i.e., embodiment) of $\mathcal{F}_{A^2PAKE}$ that, in turn, leverages the 2HashDH TDH instantiation of $\mathcal{F}_{TOPRF}$. For simplicity, an embodiment applies the same cyclic group to generate key-pairs as output by $\mathcal{F}_{A^2PAKE}$ and to instantiate the underlying distributed OPRF.

Let G be a cyclic group of primer order p with generator g. Also let H, $H_1$, and $H_2$ be three hash functions ranging over $\{0, 1\}^\ell$, G, and $\mathbb{Z}_q$, respectively. Given an input x and a key k from $\mathbb{Z}_q$, function $f_k(x)$ is $H_2(x, H_1(x)^k)$ (where key k is shared (e.g., additively split) among the servers).

Figure 4:
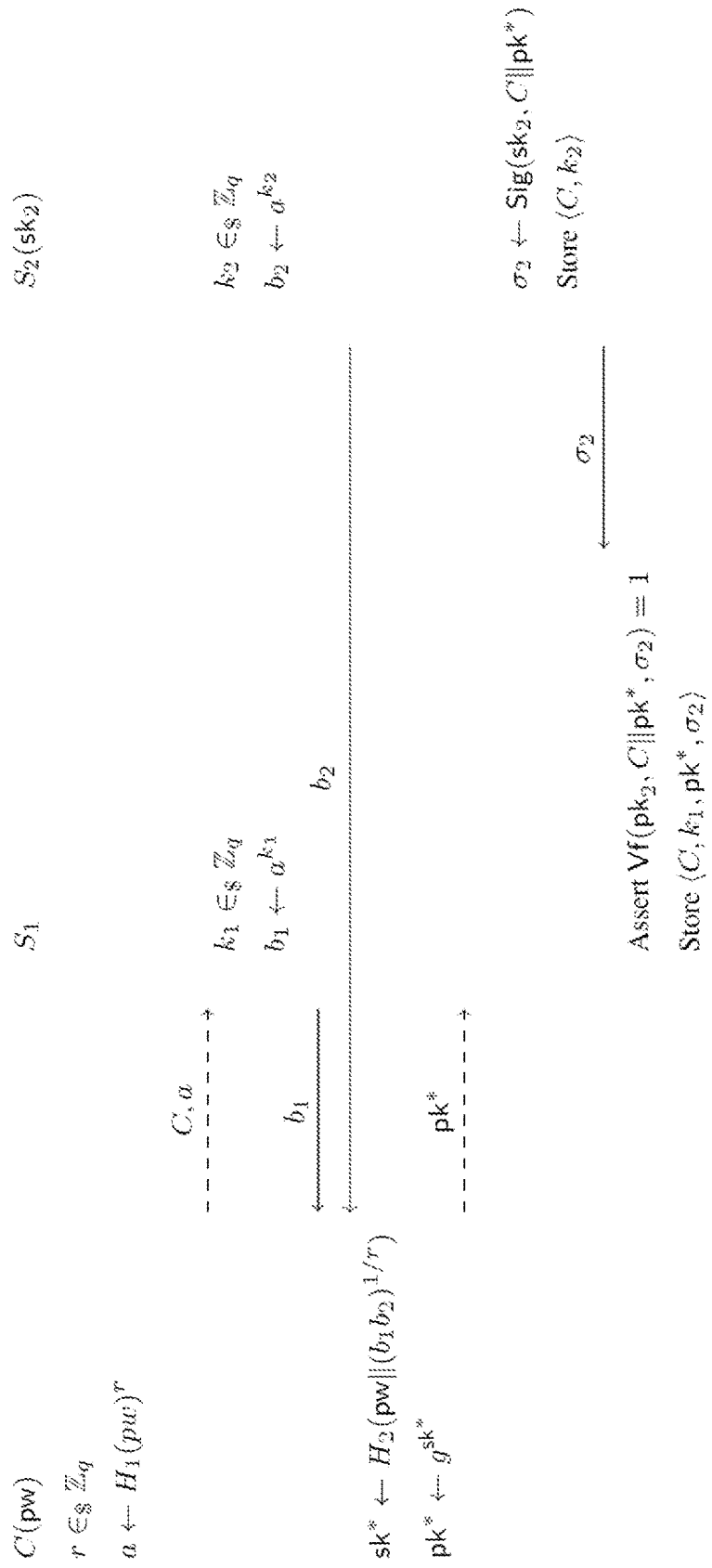
FIG. 4 provides an instantiation of $A^2PAKE$ (registration phase), according to an embodiment of the present invention.

FIG. 4 describes an embodiment of the registration protocol where dashed arrows indicate broadcast messages. The client C, and the two servers $S_1$, and $S_2$, run the OPRF protocol with private input the password pw, a key share $k_1$, and a key share $k_2$, respectively. Note that $k_1$ and $k_2$ are chosen within the protocol for that specific client. The private client's output is set as its secret key sk* with corresponding public key pk*. The public key is sent by the client to both servers via an authenticated channel so that pk* can be bound to a client identity. Examples of an authenticated channel appear in Section 1, above. One option is for the client to sign pk* with its digital ID (e.g., eID) so to bind the public key to an ID number. Server $S_2$ signs the public key received by the client and provides $S_1$ with the signature—thereby witnessing a correct client registration. At the end of the registration, the user must only remember the username C and password. In an embodiment, $S_2$ remembers (i.e., stores) the client's username and the key-share $k_2$, whereas $S_1$ stores the tuple (C, $k_1$, pk*, σ).

Figure 5:
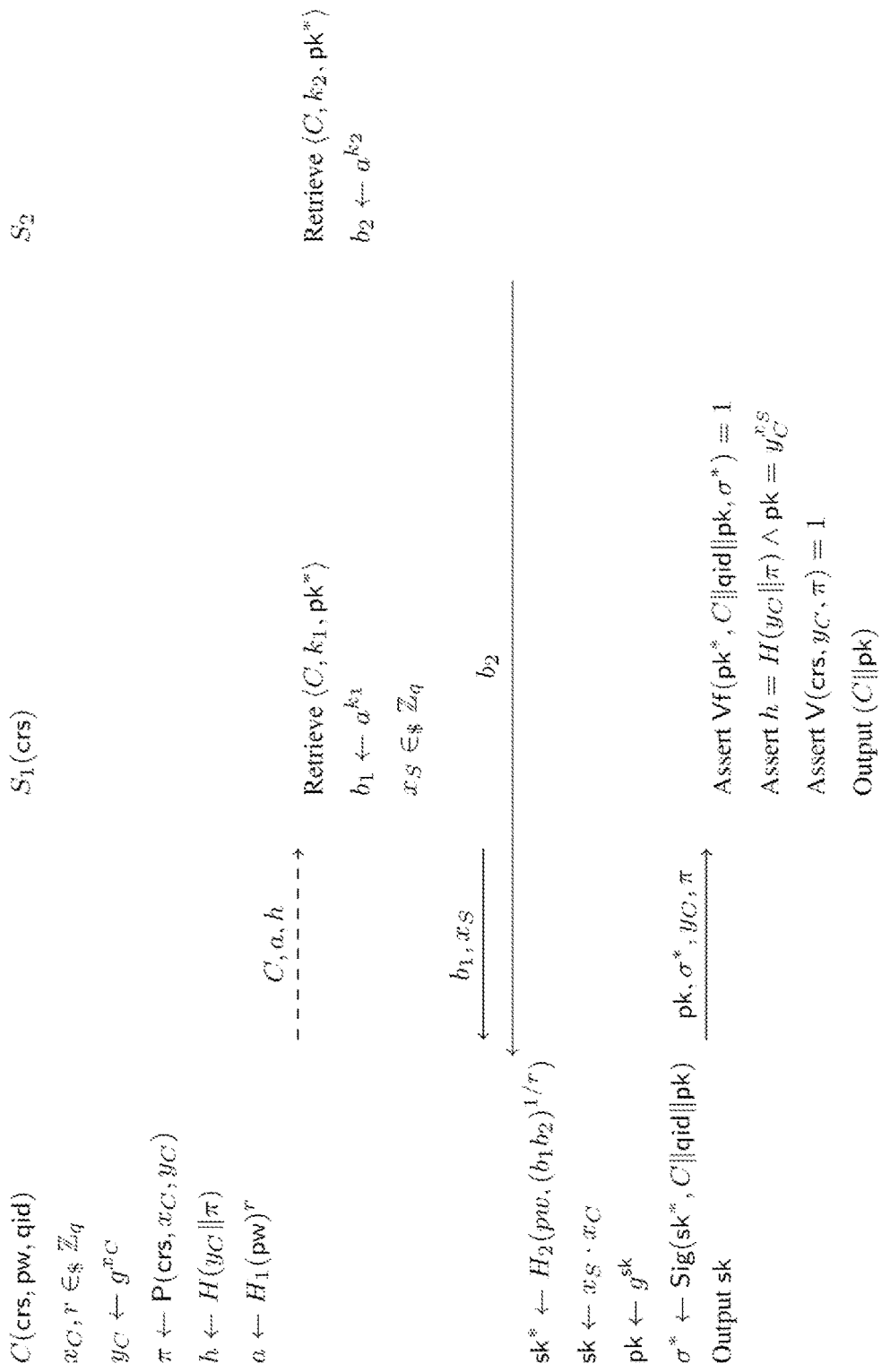
FIG. 5 provides an instantiation of $A^2PAKE$ (authentication phase), according to an embodiment of the present invention.

In turn, FIG. 5 describes an embodiment of the authentication protocol (again, dashed arrows depict broadcast channels). The output key-pair sk, pk is generated by using randomness provided by both the client and $S_1$, but the secret key sk is only learned by the client. The distributed OPRF protocol is run (as during registration) so that the client can recover sk* (e.g., the root secret key) and authenticate the newly-generated public key pk. Server $S_1$ accepts the public key only if it was correctly generated by the client and the signature on that public key verifies under key pk*.

An embodiment of the auditing procedure is described. Given the transcript of an authentication protocol with client C (with output pk), server $S_1$ recovers the tuple (C, $k_1$, pk*, $\sigma_2$) stored during registration, and sends to the auditor the tuple (C, pk, σ*, pk*, $\sigma_2$). The auditor confirms that (i) $S_2$ witnessed the registration of pk* by client C and (ii) pk was certified by pk* (e.g., the root public key). In other words, the auditor confirms that σ* is a valid signature of the fresh public key pk under key pk*, and that $\sigma_2$ is a valid signature of the message C||pk* under key $pk_2$—the public key of $S_2$. If both checks succeed, the auditor concludes that pk belongs to client C.

5. Evaluation

An embodiment of the $\mathcal{F}_{A^2PAKE}$ instantiation presented in the previous section is now described. The embodiment is written in python with the Charm-crypto library (see http://charm-crypto.io/) for cryptographic operations. ECDSA is instantiated over elliptic curve prime192v1 as the digital signature scheme. Thus, signature generation and verification take one- and two-point multiplications, respectively. Further each signature amounts to two elements in $\mathbb{Z}_p$. The same curve was used to instantiate the 2HashDH TDH distributed OPRF. Random oracles were instantiated with SHA256.

Theoretical overhead. We now provide a theoretical evaluation of the computation and communication overhead of the protocols in FIGS. 4 and 5. For elliptic curve operations, reported are the number of point multiplications (mults).

During registration, the client computes 2 mults and 2 hashes; apart from a username, the client sends two group elements and a signature. This signature is the one that $S_2$ sends to $S_1$ at the end of the registration protocol in FIG. 4. The client serves as a proxy between the two servers, which lack a dedicated connection (and, in an embodiment, do not know the respective electronic address of the other server). During authentication, the client computes 6 mults, one signature and 3 hashes; apart from a username, the client sends 3 group elements, a signature, a proof of knowledge of discrete log (one group element and one element in $\mathbb{Z}_q$), and one hash.

At registration time, server $S_1$ computes a single exponentiation and verifies the validity of a signature; it sends one group element. During authentication, $S_1$ computes one exponentiation and one hash. It also verifies a signature and a proof-of-knowledge of discrete log (two mults). $S_1$ sends one group element and one element in $\mathbb{Z}_p$.

During registration, server $S_2$ computes one exponentiation and one signature; it sends one group element and a signature (to the client that will forward it to $S_1$). During authentication, $S_2$ computes one exponentiation and sends one group element.

Baseline comparison. As a baseline comparison for $A^2PAKE$, an embodiment implements a client-server protocol that enables (i) the server to authenticate the client and (ii) both of the server and client to generate an asymmetric key pair such that the secret key is only learned by the client. For example, client and server can run a distributed coin-tossing protocol (i.e., a randomized protocol) similar to the one of FIG. 5 (e.g., the client sends $H(g^{x_C})$ for random $x_C$, the server sends random $x_S$, the client sets $sk=x_C \cdot x_S$ and sends $pk=g^{sk}$).

Further, the client derives a MAC key from the password (e.g., via PBKDF2) and authenticates the public key pk. The server uses the password to derive the same MAC key and accepts pk only if the MAC sent by the client is valid. This embodiment of the protocol does not ensure non-repudiation (since either party could have created and MACed a key-pair), but it serves an example of how to authenticate clients and create fresh key-pairs by using passwords.

TABLE 1, which appears below, contains an embodiment of Ideal Functionality $\mathcal{F}_{A^2PAKE}$.

TABLE 1

Functionality $\mathcal{F}_{A^2PAKE}$ [KGen]:

The functionality is parameterised by a security parameter λ and an asymmetric public key generation algorithm KGen. The functionality receives from the environment the set $\mathbb{C}$ of corrupted parties. Let $\mathbb{H}$ be the set of honest parties. Let $\mathcal{D}_{pk}$ (resp. $\mathcal{D}_{pw}$) be the database of TABLE 1-continued Functionality $\mathcal{F}_{A^2PAKE}$ [KGen]:

the completed session (resp. of the registered passwords). Both $\mathcal{D}_{pk}$ and $\mathcal{D}_{pw}$ are initialized to empty. The functionality has n client $C_1, ..., C_n$, two servers $S_1$ and $S_2$ and an auditor A:

Registration: On (resister, sid, pw) from $C_j$. If the request is valid (namely, there is no record
    of the form (sid, $C_j$, *) $\in \mathcal{D}_{pw}$) create a fresh record (sid, $C_j$, pw) in $\mathcal{D}_{pw}$.
    Send (registered, sid, $C_j$) to $S_1$, $S_2$ and S.

Init: On (init, sid, qid, j) from a party $\mathcal{P} \in \{C_j, S_1, S_2\}$. Send (init, sid, qid, j, $\mathcal{P}$) to S. Record that $\mathcal{P}$ initialized the session. If $C_1$, $S_1$ and $S_2$ initialized the session, then record that the session (sid, qid, j) is active for $S_1$ and $C_j$.

Test Password: On (test, sid, j, pw') from S. Check whether an entry (sid, $C_j$, pw) $\in \mathcal{D}_{pw}$ exists. If pw = pw' then reply S with correct and set corrupt (sid, j) $\leftarrow$ 1. Notify both $S_1$ and $S_2$.

New Key: On message (newkey, sid, qid, j, $\mathcal{P}$) from S.
- Assert (sid, j, pw) $\in \mathcal{D}_{pw}$ and $\mathcal{P} \in \{C_j, S_1\}$ and that session (sid, qid, j) is active for $\mathcal{P}$;
- Mark Session (sid, qid, j) for $\mathcal{P}$ as finalized;
- If corrupt (sid, j) then:
  - If (sid, qid, j, $\mathcal{P}$, sk, pk) exists in the database retrieve the tuple,
  - else sample (sk, pk) $\leftarrow_s$ KGen ($1^\lambda$) and register (sid, qid, j, $\mathcal{P}$, sk, pk).
  Else:
  - If (sid, qid, j,*, sk, pk) exists register (sid, qid, j, $\mathcal{P}$, sk, pk)
  - else sample (sk, pk) $\leftarrow_s$ KGen ($1^\lambda$) and register (sid, qid, j, $\mathcal{P}$, sk, pk).
- If $S_1 \in \mathbb{H}$ and $\mathcal{P} = S_1$ register (sid, qid, $C_j$, pk) in $\mathcal{D}_{pk}$;
- If $\mathcal{P} = C_j$ then send a private delayed output (output, sid, qid, j, sk) to $C_j$ and the public key to S;
- If $\mathcal{P} = S_1$ then send a public delayed output (output, sid, qid, j, pk) to $S_1$;
- If corrupt (sid, j) then send sk to S.

Invalid: On message (invalid, sid, qid, j, $\mathcal{P}$) from S and $\mathcal{P} \in \{C_1, ..., C_n S_1\}$. If $\mathcal{P} \in \{S_1, C_j\}$ send (output, sid, qid, j, $\perp$) to $\mathcal{P}$ and mark the session finalized for $\mathcal{P}$.

Audit: On message (audit, sid, qid, $C_j$, pk) from party $S_1$. Set b $\leftarrow \perp$. Next,
- If corrupt (sid, j) wait for a bit b' from the adversary S and set b $\leftarrow$ b'.
- NON-FRAMEABILITY. If $C_j \in \mathbb{H} \wedge \neg$corrupt (sid, j) $\wedge$ (sid, qid, $C_j$, pk) $\notin \mathcal{D}_{pk}$ then set b $\leftarrow$ 0.
- NON-REPUDIABILITY. If $S_1 \in \mathbb{H} \wedge C_j \in \mathbb{C} \wedge$ (sid, qid, $C_j$, pk) $\in \mathcal{D}_{pk}$ then set b $\leftarrow$ 1.

Send the public delayed output b to A.

TABLE 2, which appears below, contains an embodiment of Ideal Functionality $\mathcal{F}_{TOPRF}$. Label 0 is reserved for the honest execution.

TABLE 2

Functionality $\mathcal{F}_{TOPRF}$:

The functionality is parametrized by a positive integer t and runs with a client C servers $S_1$, $S_2$, auditor A and an adversary $\mathcal{A}$. It maintains a table T($\bullet$, $\bullet$) initialized with null entries and a vector tx($\bullet$) initialized to 0.

Initialization:
- On (Init, sid) from $S_i$, $i \in \{1, 2\}$ send (Init, sid, $S_i$) to the adversary $\mathcal{A}$ and mark $S_i$ active.
- On (Init, sid, $\mathcal{A}$, k) from $\mathcal{A}$ check that k is unused and k $\neq$ 0 and record (sid, $\mathcal{A}$, k) and return (Init, sid, $\mathcal{A}$, k) to the adversary $\mathcal{A}$.
- On (InitComplete, sid, $S_i$) for i $\in \{1, 2\}$ from the adversary $\mathcal{A}$, if $S_i$ is active send (InitComplete, sid) to $S_i$ and mark $S_i$ as initialized.

Evaluation:
- On (eval, sid, ssid, $\mathcal{P}$, x) from $\mathcal{P} \in \{C, \mathcal{A}\}$, if tuple (ssid, $\mathcal{P}$, *) already exists, ignore. Else, record (ssid, $\mathcal{P}$, x) and send (eval, sid, ssid, $\mathcal{P}$) to $\mathcal{A}$.
- On (SndrComplete, sid, ssid, i) for i $\in \{1, 2\}$ from $\mathcal{A}$ ignore if $S_i$ is not initialized. Else
  set tx(i) + + and send (SndrComplete, sid, ssid) to $S_i$.
- On (RcvComplete, sid, ssid, $\mathcal{P}$, p*) for $\mathcal{P} \in \{C, \mathcal{A}\}$ from $\mathcal{P}$, retrieve (ssid, $\mathcal{P}$, x) if it exists, and ignore this message if there is no such tuple or if any of the following conditions fails:
  (i)    if p* = 0 then tx(1) > 0 and tx(2) > 0,
  (ii)   if both servers are honest then p* = 0.
  If p* = 0 then set tx(1) − − and tx(2) − −. If T(p*, x) is null, pick $\rho$ uniformly at random from $\{0, 1\}^t$ and set T (p*, x) := $\rho$. Send (eval, sid, ssid, T(p*, x)) to $\mathcal{P}$.

TABLE 3, which appears below, contains an embodiment of Protocol for Client $C_j$.

TABLE 3

Protocol for Client $C_j$:

- On (register, sid, pw)
  send (eval, sid, j, qid, pw) to $\hat{\mathcal{F}}_{TOPRF}$,
  send (CRS, sid, $C_j$, $S_1$) to $\mathcal{F}_{CRS}$,
  receive (eval, sid, j, qid, ρ), from $\hat{\mathcal{F}}_{TOPRF}$
  receive (CRS, sid, crs) from $\mathcal{F}_{CRS}$
  set pk* = $g^ρ$
  send (round1-reg, sid, j, pk*) using $\mathcal{F}_{AUTH}$ to both $S_1$ and $S_2$.
- On (init, sid, j, qid)
  set sid':= (sid || qid || j),
  sample $x_C \leftarrow_\$ \mathbb{Z}_q$ and set $y_C \leftarrow g^{x_C}$,
  Compute $π \leftarrow P$ (crs, sid', $y_C$, $x_C$),
  send (RO, sid' || $y_C$ || π) and receive (RO, h) from $\mathcal{F}_{RO}$,
- On (round2, sid', $x_S$) from $S_1$,
  set pk = $g^{x_C \cdot x_S}$
  compute $σ_C \leftarrow$ Sign(ρ, sid' || pk),
  send (round3, sid', $y_C$, π, h, pk, $σ_C$) to $S_1$ and output sk = $x_C \cdot x_S$.

TABLE 4, which appears below, contains an embodiment of a protocol for Server $S_1$.

TABLE 4

Protocol for Server $S_1$:

- On (register, sid, j) send (Init, sid, j) to $\hat{\mathcal{F}}_{TOPRF}$,
  send (CRS, sid, $C_j$, $S_1$) to $\mathcal{F}_{CRS}$
  receive (InitComplete, sid, j) from $\hat{\mathcal{F}}_{TOPRF}$.
  receive (CRS, sid, crs) from $\mathcal{F}_{CRS}$
  Wait to receive:
- (round1-reg, sid, j, pk*) from $\mathcal{F}_{AUTH}$;
- (round2-reg, $σ_2$) from $S_2$;
- (SndrComplete, sid, j, qid) from $\hat{\mathcal{F}}_{TOPRF}$.
  Assert Vf($pk_2$, sid|| j || pk*, $σ_2$) = 1 and store (sid, j, pk*).
- On (init, sid, j, qid), set sid' := (sid || qid || j).
  Wait to receive:
  - (SndrComplete, sid, j, qid) from $\hat{\mathcal{F}}_{TOPRF}$;
  Sample $x_S \leftarrow_\$ \mathbb{Z}_q$ and send (round2, sid', $x_S$) to $C_j$
- On (round3, sid', $y_C$, π, h, pk, σ) from $C_j$,
  assert the output (RO, h') of $\mathcal{F}_{RO}$ on input (sid' || $y_C$ || π) fulfills h' = h and
  V(crs, sid', $y_C$, π) = 1,
  assert pk = $y_C^{x_S}$
  register the tuple (sid, qid, j, pk).
- On (audit, sid, qid, j) retrieve
  (sid, j, pk*, $σ_2$), (sid, qid, j, pk, $σ_C$)
  send (audit, sid, qid, j, pk*, $σ_2$, pk, $σ_C$) to A.

TABLE 5, which appears below, contains an embodiment of a protocol for Server $S_2$.

TABLE 5

Protocol for Server $S_2$:

- At first activation sample $s_2 \leftarrow_\$ \mathbb{Z}_q$ and
  send (register, sid, $s_2$) to $\mathcal{F}_{KRK}$.
- On (register, sid, j)
  send (init, sid, j) to $\hat{\mathcal{F}}_{TOPRF}$,
  Wait to receive:
  - (InitComplete, sid, j) from $\hat{\mathcal{F}}_{TOPRF}$ and,
  - (round1-reg, sid, j, pk*) from $\mathcal{F}_{Auth}$.
  compute $σ_2 \leftarrow$ Sign($sk_2$, sid || j || pk*)
  send (round2-reg, $σ_2$) to $S_1$.
- On (Init, sid, qid, j), set sid' := (sid || qid || j),
  Wait to receive
  (SndrComplete, sid, j, qid) from $\hat{\mathcal{F}}_{TOPRF}$.

TABLE 6, which appears below, contains an embodiment of a protocol for Auditor A.

TABLE 6

Protocol for Auditor A:

- On (audit, sid, qid, j, pk*, $σ_2$, pk, $σ_C$) from $S_1$,
  send (retrieve, sid, $S_2$) to $\mathcal{F}_{KRK}$ and receive (sid, $S_2$, $pk_2$),
  output
  Vf($pk_2$, sid || j || pk*, $σ_2$) $\wedge$ Vf(pk*, || sid || qid || j || pk, $σ_C$).

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Each feature described with reference to "an embodiment" can, according to some examples, be integrated into a single embodiment. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for cryptographic key provisioning, the method comprising, via a main authentication server:
    generating a first secret key;
    registering a client by performing a first portion of a first instance of a distributed threshold oblivious pseudo-random function,
    the first instance of the function resulting in the client obtaining a root secret key and the main authentication server obtaining a corresponding root public key; and
    authenticating the client to the main authentication server by performing a first portion of a second instance of the distributed threshold oblivious pseudo-random function,
    the second instance of the function resulting in the client obtaining the root secret key;
    wherein information stored by the client, the first secret key, and a second secret key generated by a support authentication server are inputs to at least one of the first and second instances of the distributed threshold oblivious pseudo-random function.

2. The method of claim 1, wherein the main authentication server keeps the first secret key private such that neither the client nor the support authentication server receives the first secret key.

3. The method of claim 2, wherein the support authentication server keeps the second secret key private such that neither the client nor the main authentication server receives the second secret key.

4. The method of claim 1, wherein the main authentication server performs the first portion of the first instance of the function in conjunction with the client and the support authentication server has, prior to the authenticating, performed a second portion of the first instance of the function in conjunction with the client, wherein, during the authenticating, the support authentication server performs a second portion of the second instance of the function, and wherein the information stored by the client, the first secret key, and the second secret key are inputs to both the first and second instances of the distributed threshold oblivious pseudo-random function.

5. The method of claim 1, wherein the first instance of the function results in the support authentication server obtaining the corresponding root public key.

6. The method of claim 1, wherein the main authentication server receives, from the client, at least a portion of a fresh asymmetric key pair that has been signed by the client and verifies, with the corresponding root public key, the signature.

7. The method of claim 6, wherein the client has created the fresh asymmetric key pair based on randomness supplied by the main authentication server and has signed the at least a portion of the fresh asymmetric key pair with the root secret key.

8. The method of claim 7, wherein the fresh asymmetric key pair comprises a fresh public key and a fresh private key, the client has signed the fresh public key with the root secret key, and has transmitted the signed fresh public key to the main authentication server.

9. The method of claim 1, wherein after registration and before authentication, the client has cleared the root secret key from memory, wherein the root secret key obtained during registration is equal to the root secret key obtained during authentication.

10. The method of claim 1, wherein the information stored by the client comprises a user password.

11. The method of claim 1, wherein a fresh asymmetric key pair is computed based on randomness supplied by the client and randomness supplied by the main authentication server.

12. The method of claim 1, wherein the root public key obtained by the main authentication server has been certified with a digital signature belonging to the support authentication server so that a fresh asymmetric key pair is unambiguously bound to the user.

13. The method of claim 1, wherein the main authentication server generates the first secret key in response to receiving one or both of a user id and a first output based on a hash of the information stored by the client; wherein the main authentication server computes a second output based on the first secret key and transmits the second output to the client; and wherein the root secret key obtained by the client during the authentication is based on the information stored by the client, the second output, and a third output computed by the support authentication server based on the second secret key.

14. A tangible, non-transitory computer-readable medium having instructions thereon which, upon being executed by one or more processors, alone or in combination, provide for execution of a method comprising, via a main authentication server: generating a first secret key;
registering a client by performing a first portion of a first instance of a distributed threshold oblivious pseudo-random function,
the first instance of the function resulting in the client obtaining a root secret key and the main authentication server obtaining a corresponding root public key; and
authenticating the client to the main authentication server by performing a first portion of a second instance of the distributed threshold oblivious pseudo-random function,
the second instance of the function resulting in the client obtaining the root secret key; wherein information stored by the client, the first secret key, and a second secret key generated by a support authentication server are inputs to at least one of the first and second instances of the distributed threshold oblivious pseudo-random function.

15. A main authentication server comprising one or more processors, which alone or in combination, are configured to provide for performance of a method for cryptographic key provisioning, the method comprising, via the one or more processors of the main authentication server:
generating a first secret key;
registering a client by performing a first portion of a first instance of a distributed threshold oblivious pseudo-random function,
the first instance of the function resulting in the client obtaining a root secret key and the main authentication server obtaining a corresponding root public key; and
authenticating the client to the main authentication server by performing a first portion of a second instance of the distributed threshold oblivious pseudo-random function,
the second instance of the function resulting in the client obtaining the root secret key; wherein information stored by the client, the first secret key, and a second secret key generated by a support authentication server are inputs to at least one of the first and second instances of the distributed threshold oblivious pseudo-random function.

\* \* \* \* \*